United States Patent
Desclos et al.

(10) Patent No.: US 10,536,920 B1
(45) Date of Patent: Jan. 14, 2020

(54) SYSTEM FOR LOCATION FINDING

(71) Applicant: Ethertronics, Inc., San Diego, CA (US)

(72) Inventors: Laurent Desclos, San Diego, CA (US); Jeffrey Shamblin, San Marcos, CA (US)

(73) Assignee: Ethertronics, Inc., San Diego, CA (US)

(*) Notice: Subject to any disclaimer, the term of this patent is extended or adjusted under 35 U.S.C. 154(b) by 0 days.

(21) Appl. No.: 14/993,016

(22) Filed: Jan. 11, 2016

Related U.S. Application Data

(60) Provisional application No. 62/101,962, filed on Jan. 9, 2015.

(51) Int. Cl.
| | | |
|---|---|---|
| *H04W 64/00* | (2009.01) | |
| *H04W 4/02* | (2018.01) | |
| *H04W 88/12* | (2009.01) | |
| *H04W 84/12* | (2009.01) | |

(52) U.S. Cl.
CPC .......... *H04W 64/003* (2013.01); *H04W 4/02* (2013.01); *H04W 4/023* (2013.01); *H04W 64/006* (2013.01); *H04W 84/12* (2013.01); *H04W 88/12* (2013.01)

(58) Field of Classification Search
CPC ............... H04W 4/02–029; H04W 64/00–006
See application file for complete search history.

(56) References Cited

U.S. PATENT DOCUMENTS

| | | | |
|---|---|---|---|
| 6,370,369 B1* | 4/2002 | Kraiem | H04B 7/0608 375/267 |
| 6,765,536 B2 | 7/2004 | Phillips et al. | |
| 6,850,502 B1* | 2/2005 | Kagan | H04B 7/18523 370/330 |
| 6,987,493 B2 | 1/2006 | Chen | |
| 7,068,234 B2 | 6/2006 | Sievenpiper | |
| 7,215,289 B2 | 5/2007 | Harano | |
| 7,830,320 B2 | 11/2010 | Shamblin | |
| 7,911,402 B2 | 3/2011 | Rowson et al. | |
| 8,331,265 B2* | 12/2012 | Yong | H04B 7/0695 370/254 |
| 8,362,962 B2* | 1/2013 | Rowson | H01Q 1/243 343/700 MS |
| 8,446,318 B2 | 5/2013 | Ali et al. | |
| 8,648,755 B2 | 2/2014 | Rowson et al. | |

(Continued)

OTHER PUBLICATIONS

Modern Antenna Handbook, Edited by Constantine A. Balanis, 2008, Published by John Wiley & Sons, Inc., p. 3.*

*Primary Examiner* — Gennadiy Tsvey
(74) *Attorney, Agent, or Firm* — Dority & Manning, P.A.

(57) ABSTRACT

A system for location finding of devices and personnel for in-building applications is described. A group of sensors are distributed throughout a region or building of interest where each sensor contains an RF transceiver and an antenna system, with the antenna system capable of generating multiple radiation patterns or modes. The assets to be tracked by the sensors can have RF transceivers associated with each asset, and these transceivers can have antenna systems capable of generating multiple radiation patterns or modes. A system controller containing a processor is integrated into the system and is used to control the sensors and assets.

19 Claims, 13 Drawing Sheets

(56) References Cited

U.S. PATENT DOCUMENTS

| | | | |
|---|---|---|---|
| 8,717,241 B2 | 5/2014 | Shamblin et al. | |
| 8,750,894 B1 * | 6/2014 | Stogaitis | G01S 5/0242 |
| | | | 455/456.1 |
| 9,110,160 B2 | 8/2015 | Desclos et al. | |
| 9,240,634 B2 | 1/2016 | Rowson et al. | |
| 9,439,151 B2 | 9/2016 | Zhu et al. | |
| 2001/0050640 A1 | 12/2001 | Apostolos | |
| 2003/0146874 A1 | 8/2003 | Kane et al. | |
| 2005/0003828 A1 * | 1/2005 | Sugar | H04W 24/00 |
| | | | 455/456.1 |
| 2005/0035906 A1 * | 2/2005 | Krause | G01S 1/56 |
| | | | 342/398 |
| 2005/0159154 A1 * | 7/2005 | Goren | H04W 64/00 |
| | | | 455/434 |
| 2006/0052114 A1 * | 3/2006 | Cuffaro | G01S 5/02 |
| | | | 455/456.1 |
| 2006/0172711 A1 * | 8/2006 | King | H04B 7/061 |
| | | | 455/101 |
| 2007/0217379 A1 * | 9/2007 | Fujiwara | G01S 5/0205 |
| | | | 370/338 |
| 2009/0232023 A1 * | 9/2009 | Soffer | H01Q 3/26 |
| | | | 370/254 |
| 2010/0302014 A1 * | 12/2010 | Gloo | G01S 5/04 |
| | | | 340/326 |
| 2012/0127976 A1 * | 5/2012 | Lin | G01S 13/82 |
| | | | 370/338 |
| 2013/0109327 A1 | 5/2013 | Matsumori et al. | |
| 2014/0162704 A1 * | 6/2014 | Choi | H04W 64/00 |
| | | | 455/456.6 |
| 2014/0308976 A1 * | 10/2014 | Garin | H04W 4/023 |
| | | | 455/456.2 |
| 2014/0324527 A1 * | 10/2014 | Kulkarni | G06Q 30/0261 |
| | | | 705/7.29 |
| 2015/0084744 A1 * | 3/2015 | Havens | G06K 7/10356 |
| | | | 340/10.3 |
| 2015/0133173 A1 * | 5/2015 | Edge | G01S 1/66 |
| | | | 455/456.6 |
| 2016/0069983 A1 * | 3/2016 | Gonia | G01S 5/0205 |
| | | | 455/456.1 |

\* cited by examiner

SYSTEM FOR LOCATION FINDING

CROSS-REFERENCE TO RELATED APPLICATIONS

This application claims benefit of priority with U.S. Provisional Ser. No. 62/101,962, filed Jan. 9, 2015; the contents of which are hereby incorporated by reference.

BACKGROUND OF THE INVENTION

Field of the Invention

This invention relates generally to the field of wireless communication; and more particularly, to location finding of communication devices and personnel for in-building applications.

Description of the Related Art

As mobile wireless devices and applications become more prevalent, location and positioning services based on global positioning systems (GPS) continue to flourish. Current GPS receiver technology allows for low cost, high performance GPS receivers to be installed in an increasing number of mobile and fixed devices. The accuracy of the GPS system has continued to improve over the years and the sensitivity of the GPS receivers continues to increase. The main limitation with GPS technology is the inability of the satellite based signals to penetrate in-building. This is due to the high attenuation of the 1575 MHz signaling through roofs and walls along with the low signal strength of the GPS signals due to atmospheric attenuation and space loss incurred from the large distance between the satellites and the surface of the Earth.

SUMMARY OF THE INVENTION

Systems and methods for location finding of devices and personnel for in-building applications is described. A group of sensors are distributed throughout a region or building of interest where each sensor contains an RF transceiver and an antenna system, with the antenna system capable of generating multiple radiation patterns or modes. The assets to be tracked by the sensors can have RF transceivers associated with each asset, and these transceivers can have antenna systems capable of generating multiple radiation patterns or modes. A system controller containing a processor is integrated into the system and is used to control the sensors and assets.

DETAILED DESCRIPTION OF THE PREFERRED EMBODIMENTS

Figure 1A:
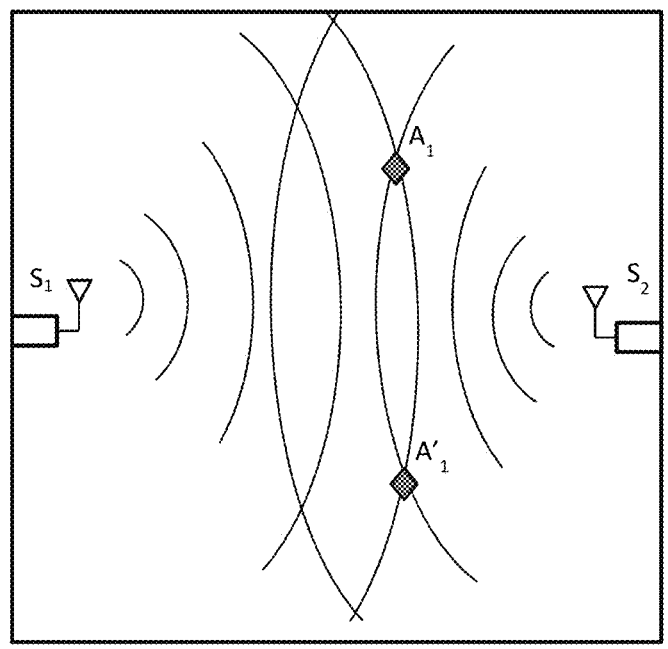
FIG. 1A shows two sensors positioned within a room where device $A_1$ is located; by analyzing RF signal strength the sensors are able to narrow a possible location of device $A_1$ within two possible locations in a reflection free environment.

In the following description, for purposes of explanation and not limitation, details and descriptions are set forth in order to provide a thorough understanding of the present invention in accordance with one or more illustrated embodiments. However, it will be apparent to those skilled in the art that the present invention may be practiced in other embodiments that depart from these details and descriptions without departing from the spirit and scope of the invention.

Now, in order to provide better in-building personnel and asset tracking, WLAN systems can be used to determine that a device on the local area network is within range of the WLAN system. WLAN systems are prevalent in homes, office, buildings, commercial buildings, airports, and outdoor urban areas. Unfortunately in-building environments exhibit high levels of multi-path from the walls, floors, furniture, and other objects that scatter, reflect, and absorb the RF signals. The multi-path environment also tends to de-polarize the radiated signal which decreases the efficiency of the communication link when highly linearly polarized antennas are used. This multi-path environment makes it difficult to determine the location of the device using a WLAN transceiver on the network. A benefit of using WLAN for asset tracking is the typical frequencies used for these systems, specifically 2.4 GHz. and the 5 GHz. band, which allows for small antenna systems that can provide efficient propagation as well as the limited range that is afforded these systems due to space loss. This limited range can be used in a location finding system if multiple transceivers are used to illuminate a volume and knowledge of the transceiver locations is available.

With a prevalence of low cost WLAN transceivers available for use for in-building location finding and tracking, what is needed is a system to process signals from a number of transceivers as well as a methodology of generating radiation patterns that can be used to illuminate different regions within a building.

The term "Modal antenna" is used herein to describe an antenna system capable of producing multiple radiation pattern modes from a single radiating element. An example of modal antenna can be referenced in commonly owned U.S. Pat. Nos. 7,911,402; 8,362,962; 8,648,755; and U.S. Ser. No. 14/144,461; the contents of each of which is hereby incorporated by reference.

This disclosure concerns a location finding system comprised of a plurality of fixed RF transceivers (herein termed "sensors") located within a volume or region and transceivers associated with assets or personnel (herein termed the "asset") to be tracked within the confines of the volume or region. Multiple radiation patterns can be generated from the antenna system integrated with the sensors and/or the antenna system integrated with the assets to be tracked, with communication link information from these multiple radiation patterns used to determine location of the asset within the volume or region. A comparison of amplitude and/or phase of the signals propagating across the communication channel for the various radiation modes can be made and analyzed to determine a set of potential locations of the asset or to eliminate locations of the asset based on current and prior measurements.

In one embodiment, a single sensor positioned in a region, with this fixed sensor containing an antenna system capable of generating multiple radiation patterns or modes. An asset to be tracked has an RF transceiver associated with it which contains an antenna system with a single, fixed radiation pattern or mode. To determine the location of the asset, the sensor samples the receive signal radiated from the transceiver associated with the asset using each of the radiation modes and saves the amplitude and/or phase data to memory. With the radiation patterns of the antenna system used by the sensor having unique pattern shapes and/or polarization properties the received amplitude and/or phase data can be analyzed to determine potential locations of the asset. A processor is connected to the sensor and an algorithm or software in the processor commands the operation of the sensor and/or asset.

In another embodiment, multiple sensors are positioned in a region, with one or multiple of these sensors containing an antenna system capable of generating multiple radiation patterns or modes. An asset to be tracked has an RF transceiver associated with it which contains an antenna system with a single, fixed radiation pattern or mode. To determine the location of the asset, the sensors sample the receive signal radiated from the transceiver associated with the asset using each of the radiation modes and saves the amplitude and/or phase data to memory. With the radiation patterns of the antenna systems used by the sensors having unique pattern shapes and/or polarization properties the received amplitude and/or phase data can be analyzed to determine potential locations of the asset. The spatial variation of the sensors within the region assist in determining the location of the asset. A processor is connected to the sensors and an algorithm or software in the processor commands the operation of the sensor and/or asset.

In another embodiment of this invention one or multiple sensors are positioned in a region, with the one or multiple of these sensors containing an antenna system with a fixed radiation pattern or mode. An asset to be tracked has an RF transceiver associated with it containing an antenna system capable of generating multiple radiation patterns or modes. To determine the location of the asset, the sensors sample the receive signal radiated from the transceiver associated with the asset using each of the radiation modes and saves the amplitude and/or phase data to memory. With the radiation patterns of the antenna systems used by the asset having unique pattern shapes and/or polarization properties the received amplitude and/or phase data can be analyzed to determine potential locations of the asset. The spatial variation of the sensors within the region assist in determining the location of the asset when multiple sensors are present. A processor is connected to the sensors and is coupled to the assets using a wireless connection and an algorithm or software in the processor commands the operation of the sensors and/or asset.

In another embodiment of this invention one sensor is positioned in a region, with the sensor containing an antenna system capable of generating multiple radiation patterns or modes. An asset to be tracked has an RF transceiver associated with it containing an antenna system capable of generating multiple radiation patterns or modes, and the asset is within the region. With this system several methods can be used to determine the location of the asset: the asset can transmit a signal from each of the radiation modes from the antenna system associated with the asset, with the sensor receiving the transmitted signals from asset using each of the radiation modes from the antenna system associated with the sensor and saving the amplitude and/or phase data to memory. Alternately, the sensor can transmit a signal from each of the radiation modes from the antenna system associated with the sensor, with the asset receiving the transmitted signals from asset using each of the radiation modes from the antenna system associated with the asset and saving the amplitude and/or phase data to memory. A processor in the asset can analyze the stored data to determine location of the asset and this location information can be transmitted to the sensor to provide location information to a controller or processor associated with the sensor. Or the amplitude and/or phase information associated with the radiation modes can be transmitted to the sensor and a processor associated with the sensor can be used to analyze the data to provide location information of the asset. With the radiation patterns of the antenna systems used by the asset having unique pattern shapes and/or polarization properties the received amplitude and/or phase data can be analyzed to determine potential locations of the asset. The spatial variation of the sensors within the region assist in determining the location of the asset when multiple sensors are present. A processor is connected to the sensor and is coupled to the asset using a wireless connection and an algorithm or software in the processor commands the operation of the sensors and/or asset.

In another embodiment of this invention multiple sensors are positioned in a region, with the sensors containing antenna systems capable of generating multiple radiation patterns or modes. Multiple assets to be tracked, with each asset having an RF transceiver associated with it containing an antenna system capable of generating multiple radiation patterns or modes are in the region. With this system several methods can be used to determine the location of the assets: the assets can transmit a signal from each of the radiation modes from the antenna system associated with the asset, with the sensor receiving the transmitted signals from asset using each of the radiation modes from the antenna system associated with the sensor and saving the amplitude and/or phase data to memory. Alternately, the sensors can transmit a signal from each of the radiation modes from the antenna system associated with the sensors, with the assets receiving the transmitted signals from asset using each of the radiation modes from the antenna system associated with the assets and saving the amplitude and/or phase data to memory. Alternately, some sensors can transmit signals from the radiation modes associated with the sensor, some sensors can receive signals from the radiation modes associated with the sensor, some assets can transmit signals from the radiation modes associated with the asset, some assets can receive signals from the radiation modes associated with the asset. A processor is connected to the sensors and contains an algorithm or software which controls the sensors and analyzes the stored data to determine location of the assets. With the radiation patterns of the antenna systems used by the assets and sensors having unique pattern shapes and/or polarization properties the received amplitude and/or phase data can be analyzed to determine potential locations of the assets. The spatial variation of the sensors within the region assist in determining the location of the assets.

In another embodiment of this invention training modes can be developed and implemented to improve accuracy of the location finding capability of the sensor network. A training mode can consist of placing an asset with RF transceiver at specific locations within the region of interest and measuring and storing the amplitude and/or phase response of the radiation modes. The sensors can contain antenna systems with multiple radiation modes and the asset used during the training mode can possess an antenna system with multiple radiation modes. Received signal strength as a function of distance from a sensor or distance from another feature in the region such as a wall can be measured and stored and used at a later date to compare to measurements during a location finding session.

Figure 1B:
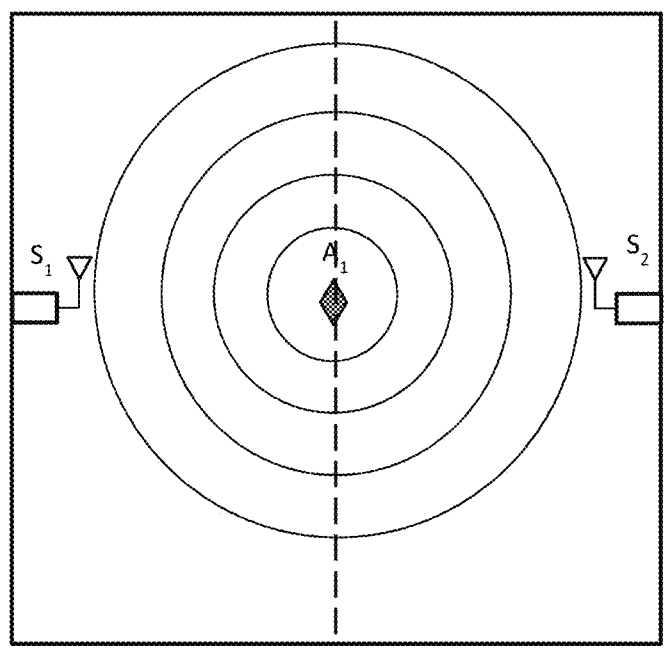
FIG. 1B shows two sensors positioned within a room where device $A_1$ is located; by analyzing RF signal strength from device $A_1$ the sensors are able to reduce location uncertainty to a line.

Now turning to the drawings:

FIGS. 1(A-B) illustrate two sensors, $S_1$ and $S_2$, illuminating a room where device $A_1$ is located. For a room free of reflections or scattering the RF wave-front radiated by the antenna system is smooth and predictable. Device $A_1'$ is either a second device or can be a false location of device $A_1$ due to the similarity of the RF wave-fronts at the location of $A_1$ and $A_1'$. Also shown is the RF radiated wave-front from an antenna system located on Device $A_1$ when the room is a reflection and scattering free environment. Analyzing RF signal strength from two sensors at device $A_1$ can determine location of device to one of two points in a reflection free environment (free space). Alternatively, analyzing RF signal strength from device $A_1$ can be used to reduce location uncertainty to a line.

Figure 2:
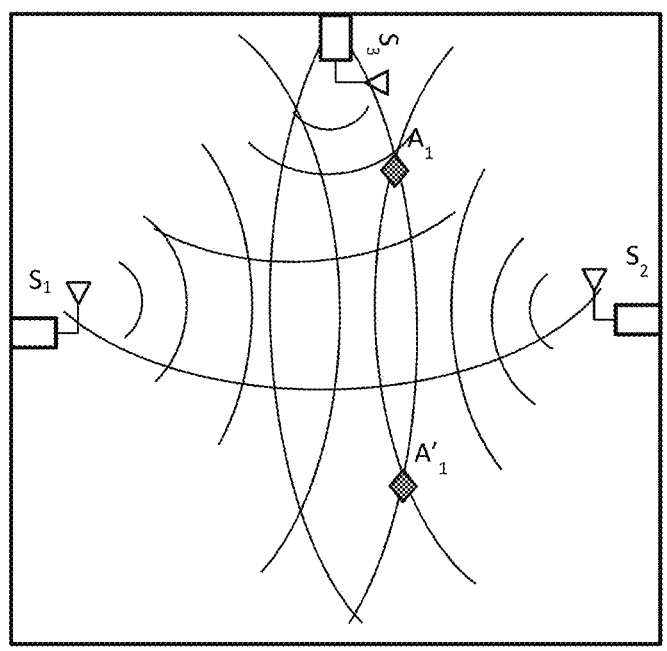
FIG. 2 shows a third sensor integrated into the example of FIG. 1A; the third sensor is used to discern the true location of device $A_1$.

FIG. 2 illustrates how a third sensor can be used to discern the true location of device $A_1$. The third sensor $S_3$ provides ability to determine location of device $A_1$ in a reflection free environment.

Figure 3A:
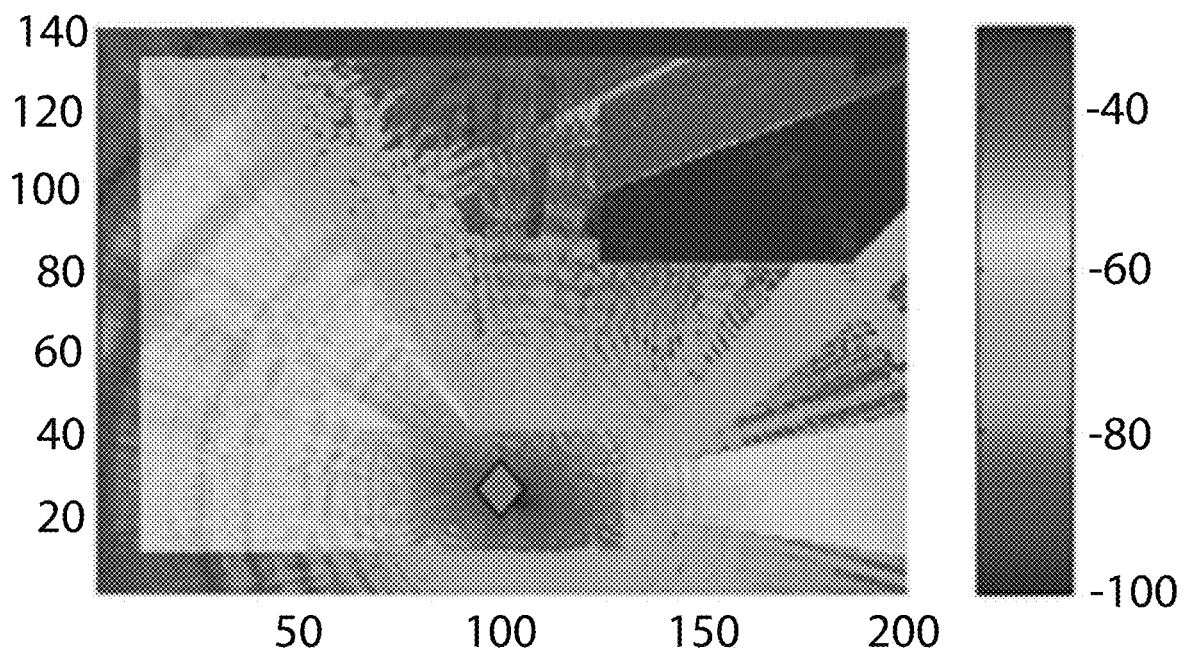
FIG. 3A shows an example of in-building propagation of an EM wave radiated from an antenna system located in one room of a house.
Figure 3B:
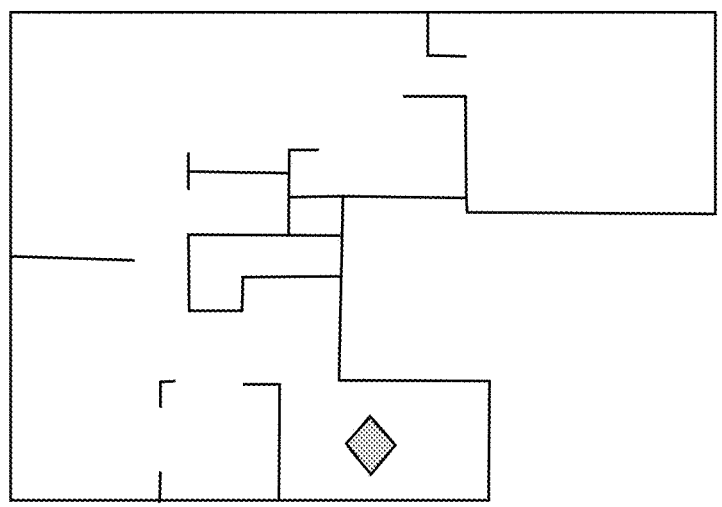
FIG. 3B shows the floorplan of the house of FIG. 3A.

FIGS. 3(A-B) illustrate an example of in-building propagation of an EM wave radiated from an antenna system located in one room of a house. Reflections and scattering of the EM wave is included in this simulation. FIG. 3B shows a floor plan of the house where the simulation of FIG. 3A was performed.

Figure 4A:
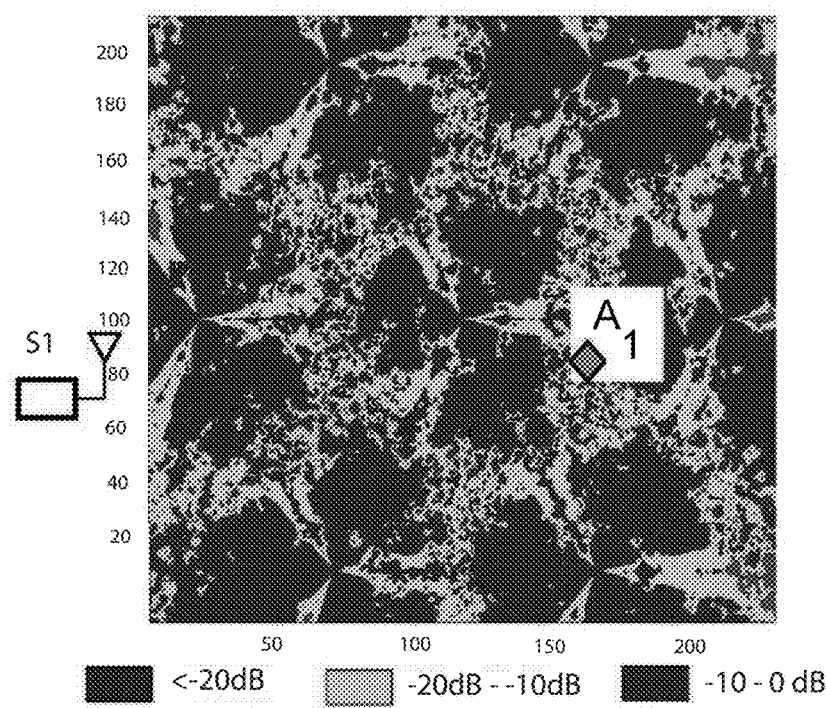
FIG. 4A shows the typical field strength profile in-building from sensor $S_1$, with the variation in signal strength due to reflections, scattering, and absorption of the EM wave.
Figure 4B:
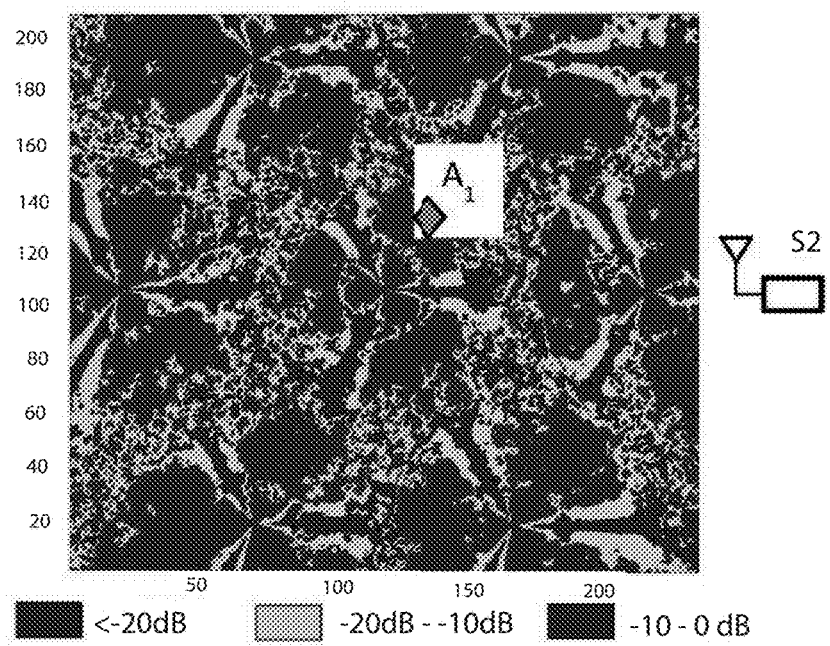
FIG. 4B shows the typical field strength profile in-building from sensor $S_2$, with the variation in signal strength due to reflections, scattering, and absorption of the EM wave.

FIGS. 4(A-B) illustrate the typical field strength profile in-building, with the variation in signal strength due to reflections, scattering, and absorption of the electromagnetic (EM) wave. The reflections and scattering eliminates the possibility of using RF signal strength from one or multiple sensors to determine location of device $A_1$. Sensor $S_1$ and $S_2$ have different field strength profiles generated by the antenna systems associated with the sensors. As shown in FIG. 4A, in-building environment has multiple sources of reflection and scattering of the RF radiated signals from sensor $S_1$ (walls, floors, furniture, etc.). The reflections and scattering eliminates the possibility of using RF signal strength from one or multiple sensors to determine location of device $A_1$. FIG. 4B shows in-building RF signal strength profile from sensor $S_2$.

Figure 5:
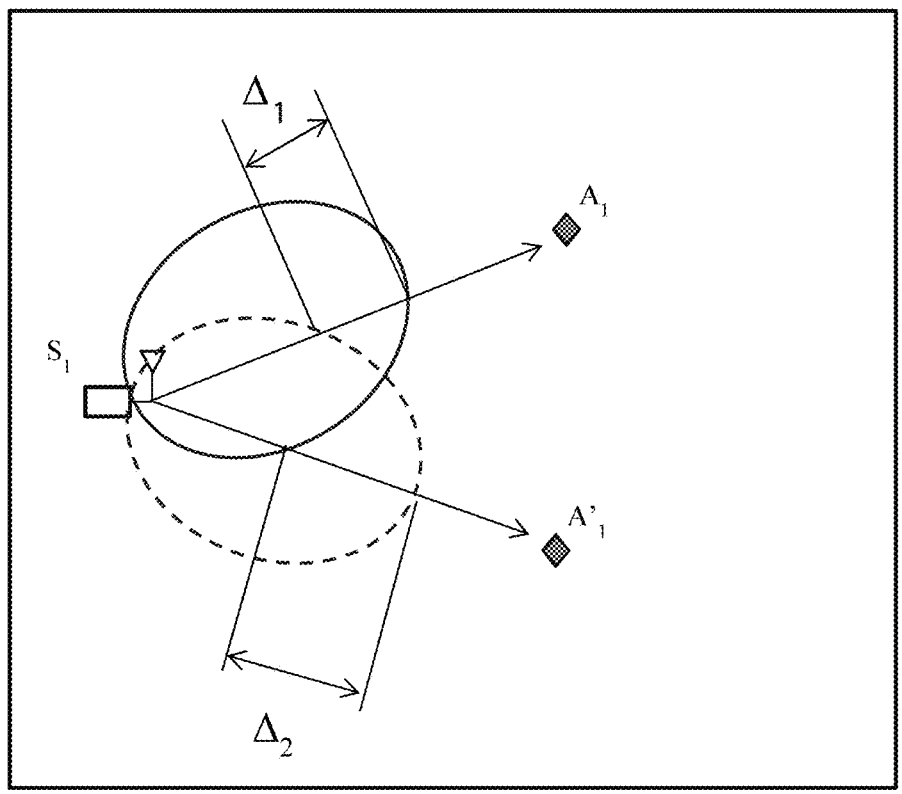
FIG. 5 shows a sensor $S_1$ which contains a modal antenna capable of generating two radiation modes.

FIG. 5 illustrates a Sensor $S_1$ which contains a modal antenna capable of generating two distinct radiation patterns, or "modes". The two modes provide different radiation patterns that can be used to determine a variation in signal strength $\Delta_1$ at device $A_1$. A priori knowledge of radiation pattern characteristics provides an indication of direction and distance to $A_1$. $A_1$ and $A'_1$ can be distinct devices, or $A'_1$ can be an erroneous location of device A1 that can be eliminated using the Mode information.

Figure 6:
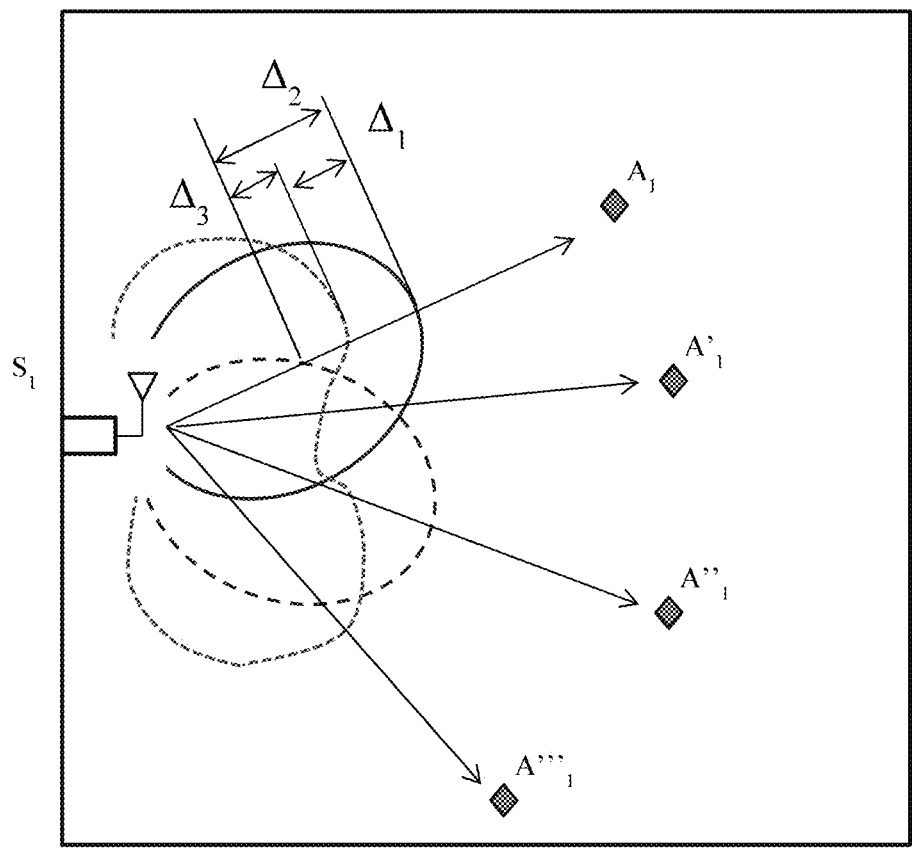
FIG. 6 shows sensor $S_1$ which is configured to produce a plurality of radiation pattern modes to provide additional signal strength deltas for improving location finding of devices.

FIG. 6 illustrates sensor $S_1$ which contains a modal antenna configured for a plurality of modes to provide additional signal strength deltas $\Delta_1$; $\Delta_2$; and $\Delta_3$ to improve location finding of devices. $A_1$, $A'_1$, $A''_1$, and $A'''_1$ can be distinct devices, or can be an erroneous location of device $A_1$ that can be eliminated using the mode information.

Figure 7:
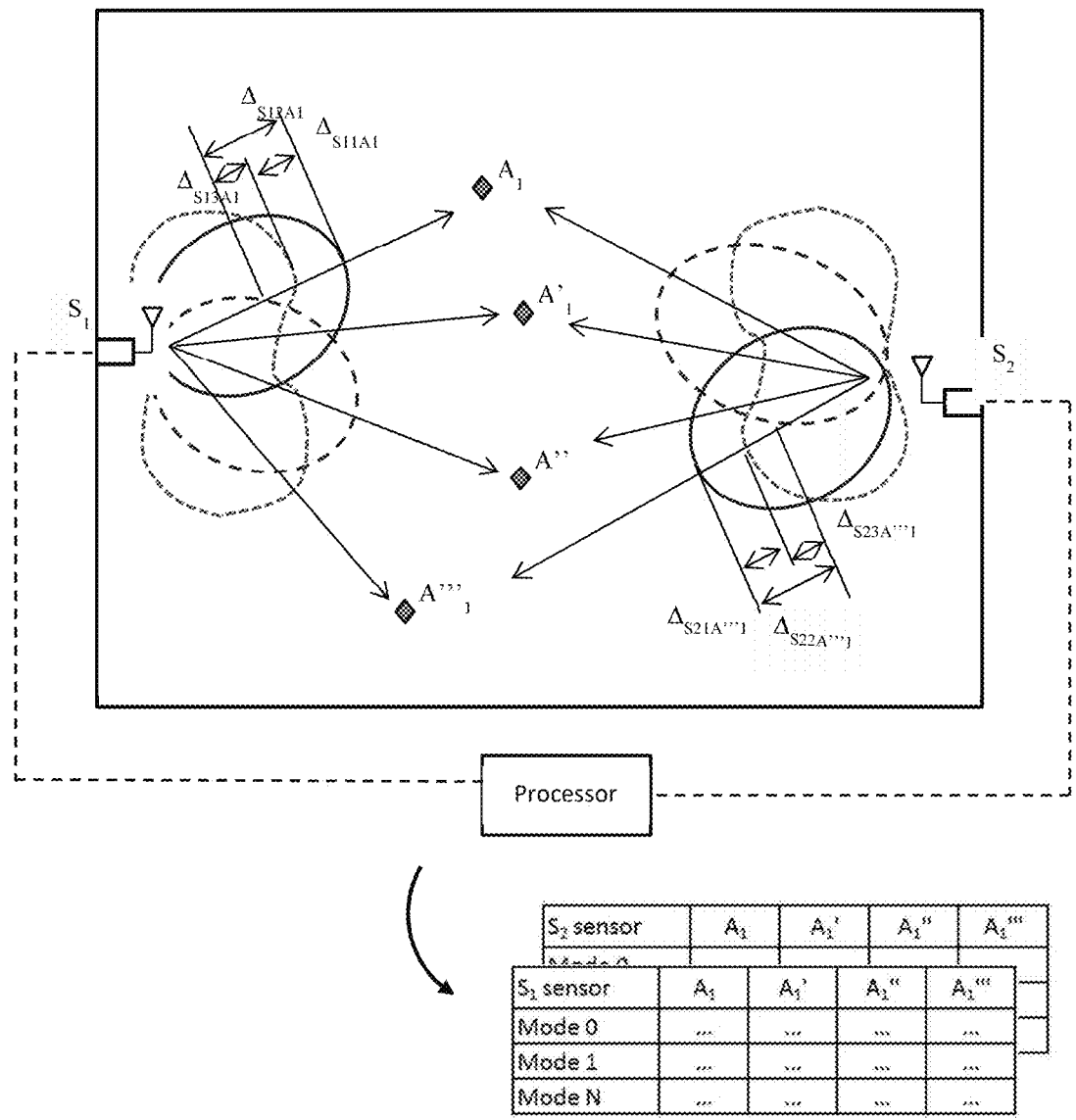
FIG. 7 illustrates a system where multiple sensors can be surveyed to develop matrices of signal strength profile per mode between sensors and devices, and a processor is used to control the two sensors and to store the measured amplitude and/or phase data measured by the sensors.

FIG. 7 illustrates a system where multiple sensors can be surveyed to develop matrices of signal strength profile per mode between sensors and devices. A processor is used to control the two sensors and to store the measured amplitude and/or phase data measured by the sensors. The sensors are each shown with a plurality of radiation pattern modes (ex: modes 0, 1, . . . , N), and corresponding signal deltas, associated with communication with asset devices $A_1$, $A'_1$, $A''_1$, and $A'''_1$. The corresponding data is stored in memory, preferably in matrices or lookup tables.

Figure 8:
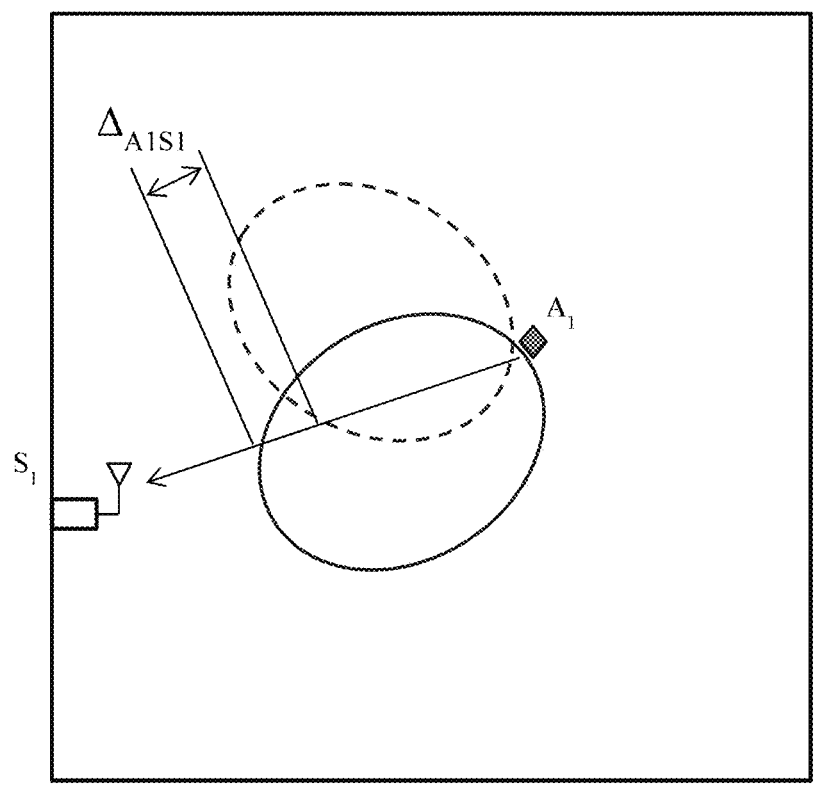
FIG. 8 illustrates a system where device $A_1$ contains a modal antenna capable of generating two radiation modes; the two modes provide different radiation patterns that can be used to determine a variation in signal strength at sensor $S_1$.

FIG. 8 illustrates a system where device $A_1$ contains a modal antenna capable of generating two radiation distinct modes. The two modes provide different radiation patterns that can be used to determine a variation in signal strength $\Delta_{A1S1}$ at sensor $S_1$. A priori knowledge of radiation pattern characteristics provides an indication of direction and distance to $S_1$.

Figure 9:
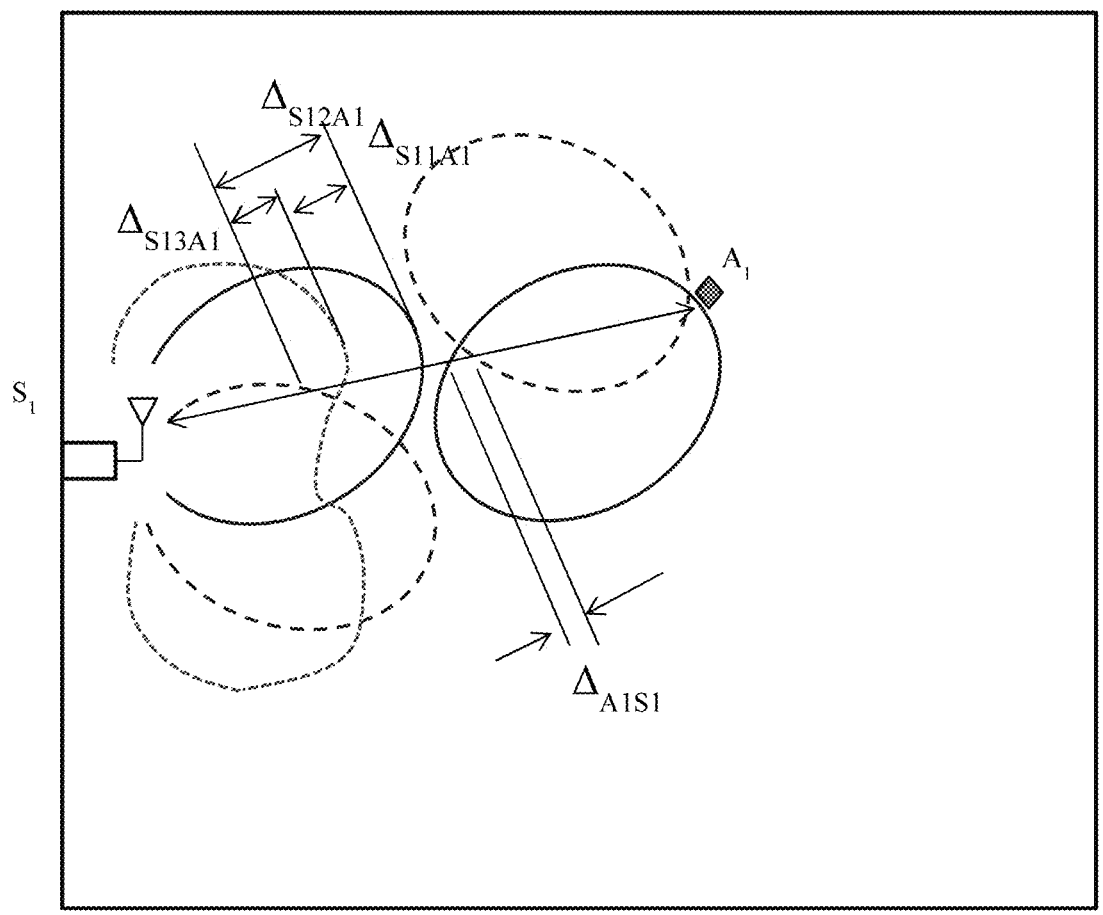
FIG. 9 illustrates a system where sensor $S_1$ is configured to produce a plurality of antenna radiation pattern modes, device $A_1$ contains a modal antenna capable of generating two radiation modes; the two modes provide different radiation patterns that can be used to determine a variation in signal strength at Sensor $S_1$.
Figure 10:
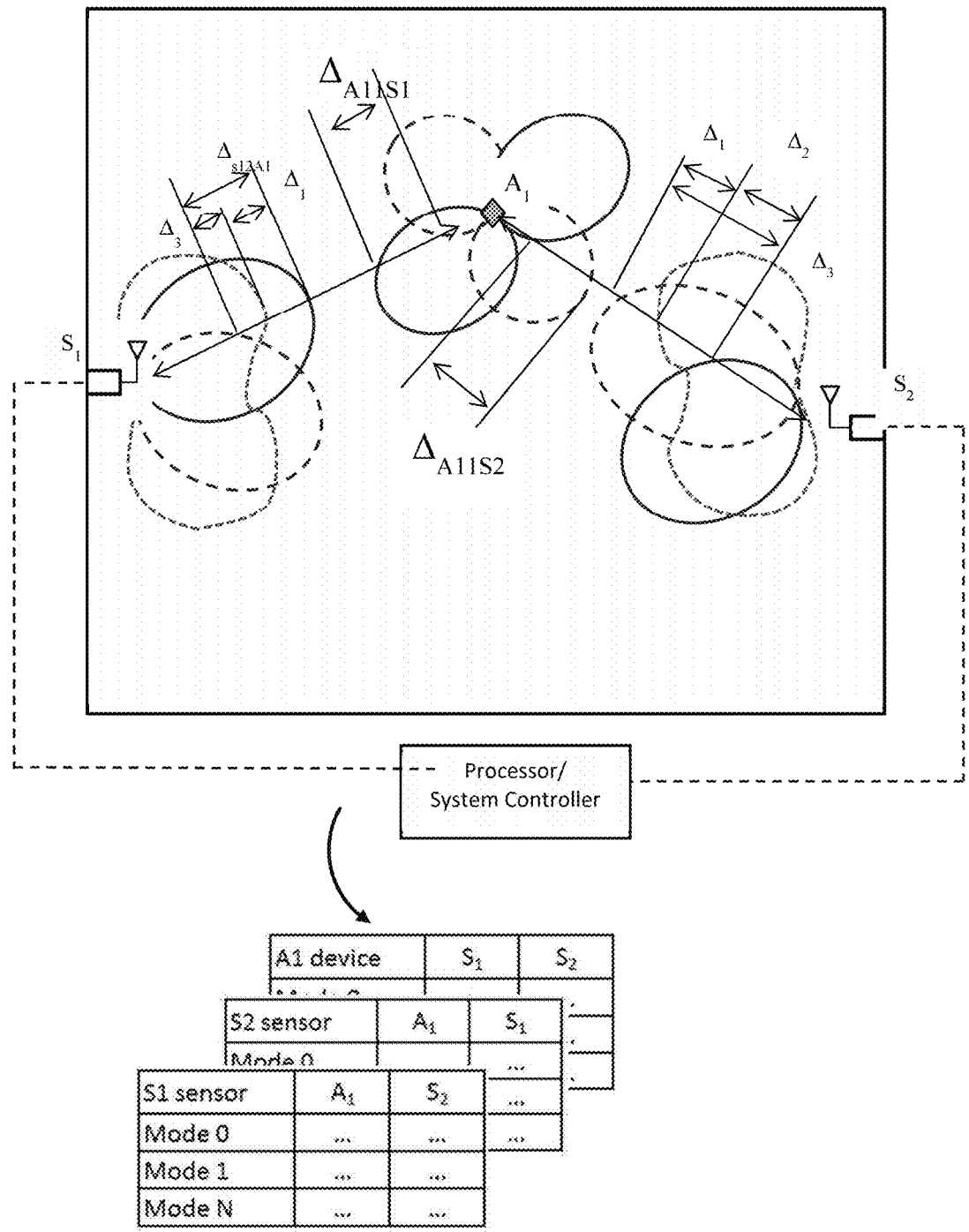
FIG. 10 shows a room with two sensors, each of the sensors includes a distinct modal antenna capable of providing a plurality of radiation pattern modes, and device $A_1$ includes a modal antenna capable of generating multiple radiation pattern modes, the multiple modes provide different radiation patterns and data associated with the antenna modes is stored in lookup tables within memory and processed by a system controller for determining device location.

FIG. 9 illustrates a system where sensor $S_1$ is configured to provide a plurality of radiation pattern modes to provide additional signal strength deltas to improve location finding of devices. Device $A_1$ contains a modal antenna capable of generating two radiation modes. The two modes provide different radiation patterns that can be used to determine a variation in signal strength at Sensor $S_1$. A priori knowledge of radiation pattern characteristics provides an indication of direction and distance to $S_1$.

Figures 11A, 11B:
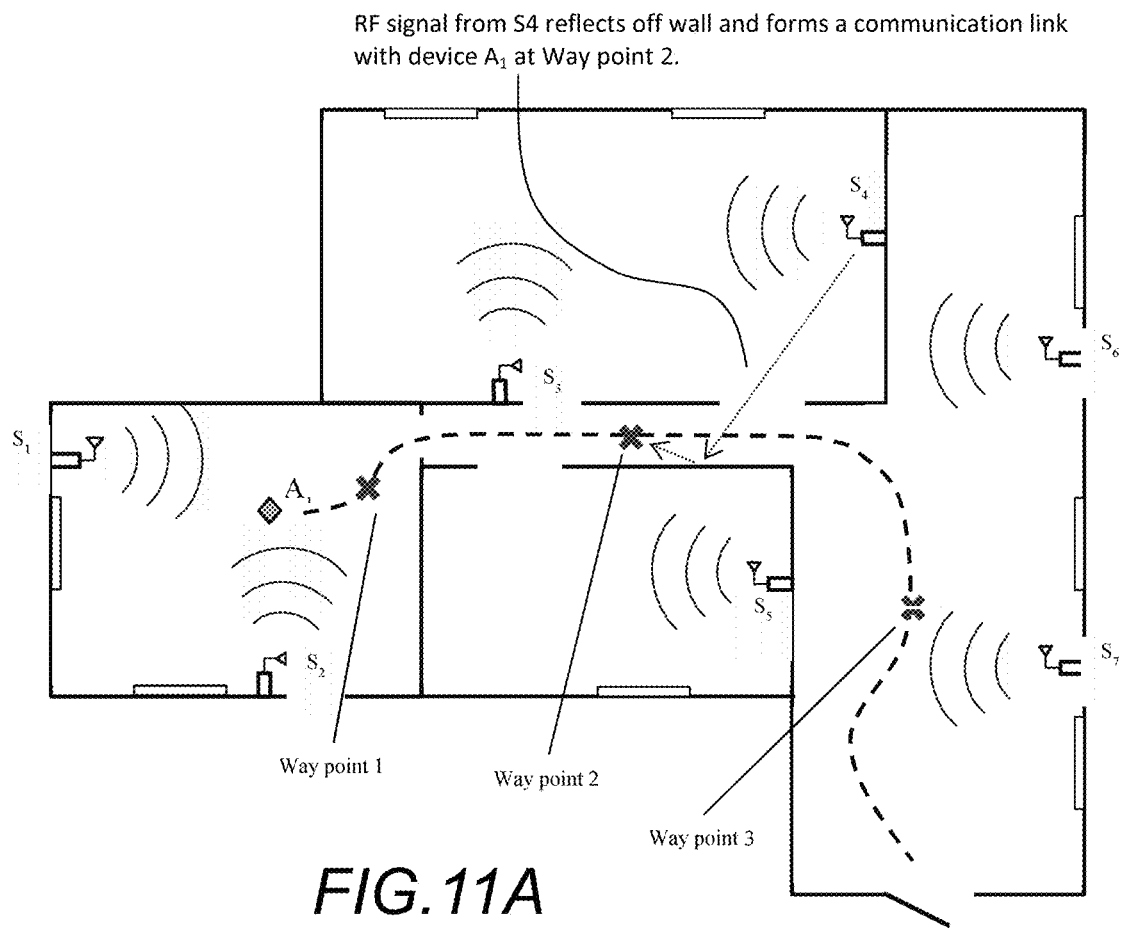
FIG. 11A shows a building wherein multiple sensors are installed and configured to determine a location and track movement of device $A_1$ as $A_1$ moves about waypoints one through three in the figure.
FIG. 11B shows a lookup table containing data related to sensors and the tracking of $A_1$ as shown in FIG. 11A.

FIGS. 11(A-B) shows a building wherein multiple sensors are installed and configured to determine a location and track movement of device $A_1$ as $A_1$ moves about waypoints one through three in the figure. Multiple sensors can be positioned in a home or business and used to determine location of and track movement of device $A_1$. Reflections and scattering of RF signals from the sensors allows for acquisition of device $A_1$ by sensors not in line-of-sight (LOS). FIG. 11B shows a lookup table containing data related to sensors and the tracking of $A_1$ as shown in FIG. 11A.

Figure 12:
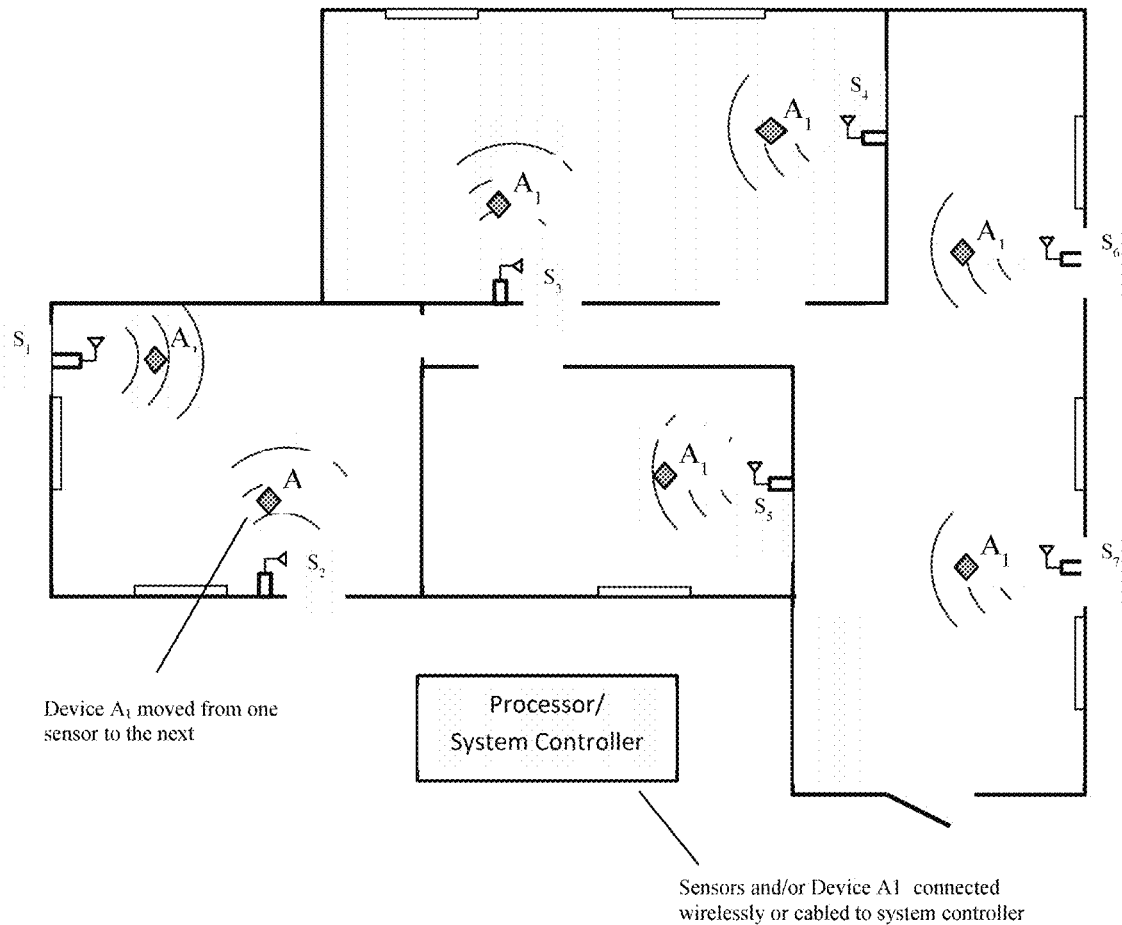
FIG. 12 shows a first training scenario, wherein device $A_1$ is positioned at a set distance from each sensor sequentially and radiation modes form each sensor and/or device $A_1$ are measured and stored in memory of a controller.

FIG. 12 shows a first training scenario, wherein device $A_1$ is positioned at a set distance from each sensor sequentially and radiation modes form each sensor and/or device $A_1$ are measured and stored in memory of a controller.

Figure 13:
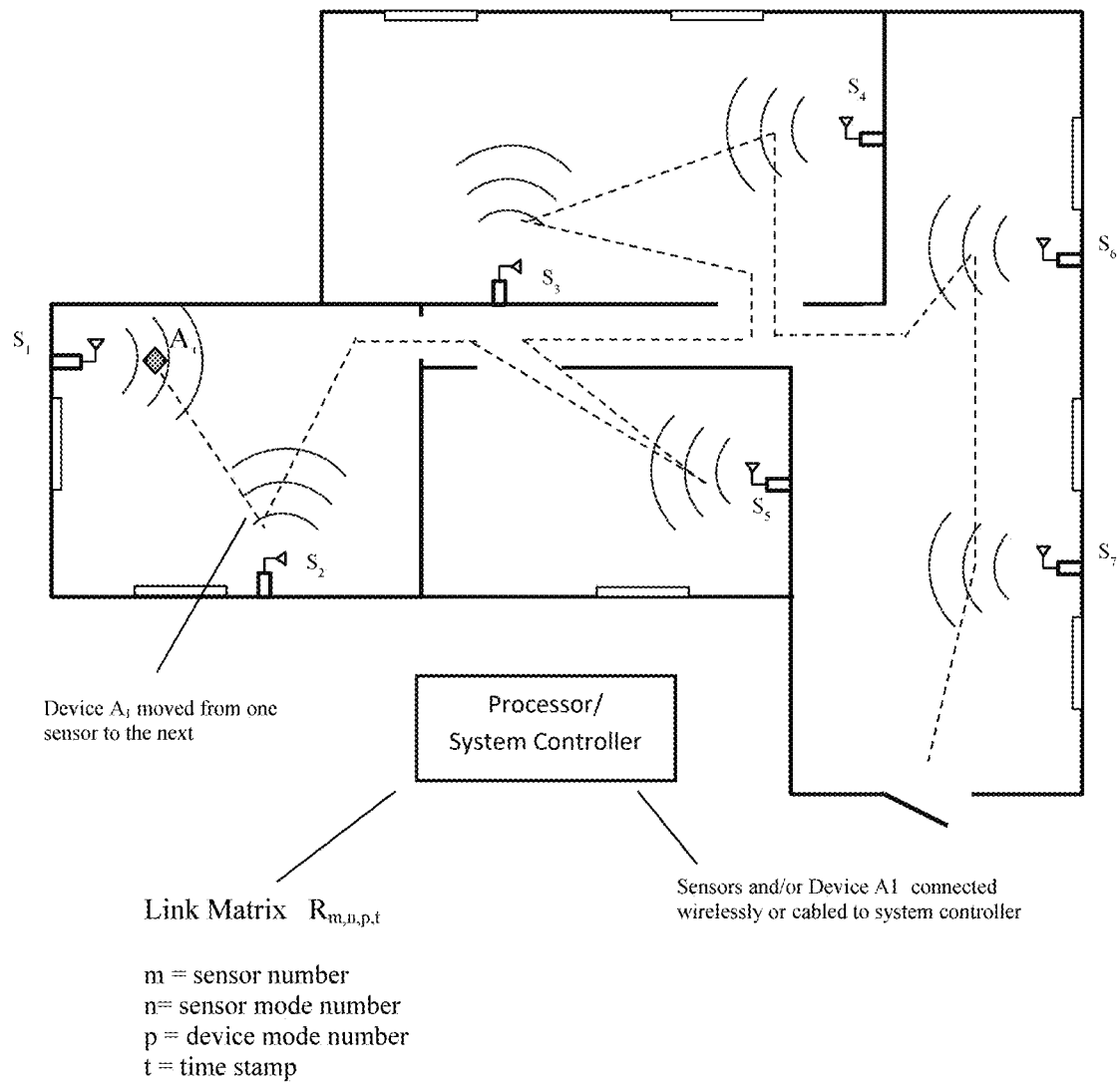
FIG. 13 shows a second training scenario, wherein device $A_1$ is moved from one sensor to the next and radiation modes are measured during transit.

FIG. 13 shows a second training scenario, wherein device $A_1$ is moved from one sensor to the next and radiation modes are measured during transit.

Thus, in accordance with the descriptions and embodiments herein, a location finding system can include: an RF sensor, the sensor including a transmitter, a receiver, and an antenna; one or multiple devices to be tracked, with each device containing a transmitter, receiver, and antenna; a system controller comprised of a processor containing an algorithm; the antenna coupled to the RF sensor is configured to generate multiple radiation patterns for transmit and/or receive functions, these multiple radiation patterns being termed modes and these modes being different from one another in terms of radiation pattern shape, polarization, and/or amplitude and phase characteristics. The RF sensor transmits a signal using multiple radiation modes of the antenna and the signals are received by the one or multiple devices. The devices transmit a signal back to the RF sensor providing amplitude and/or phase information for the signals received from the RF sensor for the multiple radiation modes. The RF sensor receives the transmitted signal from the device or devices and the received signal is transfers to the system controller. The processor and algorithm are used to analyze the amplitude and/or phase information for the multiple modes used to establish a communication link between the RF sensor and the devices to discern device location.

In some embodiments, a plurality of RF sensors can be used to transmit and receive signals from one or multiple devices. One or multiple of the RF sensors have antennas capable of generating multiple radiation modes. The devices transmit an RF signal back to the RF sensors, with the received signals at the RF sensors transferred to the system controller. The processor and algorithm in the system controller are used to analyze the amplitude and/or phase information for the multiple modes used to establish a communication link between the RF sensors and the devices to discern device location.

In certain embodiments, the RF sensor does not transmit but is used to receive signals only from the device. The device initiates the communication process by transmitting a signal to the RF sensor, with the transmitted signal received by multiple radiation modes of the RF sensor. The RF sensor receives the transmitted signals from the device and the received signals are transferred to the system controller. The processor and algorithm are used to analyze the amplitude and/or phase information for the multiple modes used to establish a communication link between the RF sensor and the devices to discern device location. Furthermore, a plurality of RF sensors can be used to receive signals from the device. One or multiple of the RF sensors have antennas capable of generating multiple radiation modes.

In another embodiment, a location finding system includes: one or multiple RF sensors, the sensor containing a transmitter, a receiver, and an antenna; one device to be tracked, the device containing a transmitter, receiver, and antenna; a system controller comprised of a processor containing an algorithm. The antenna coupled to the device is configured to generate multiple radiation patterns for transmit and/or receive functions, these multiple radiation patterns being termed modes and these modes being different from one another in terms of radiation pattern shape, polarization, and/or amplitude and phase characteristics. The RF sensor or sensors transmits a signal and the signals are received by the device using multiple radiation modes of the antenna coupled to the device. The device transmits a signal back to the RF sensors providing amplitude and/or phase information for the signals received from the RF sensors for the multiple radiation modes. The RF sensor receives the transmitted signal from the device and the received signal is transferred to the system controller. The processor and algorithm are used to analyze the amplitude and/or phase information for the multiple modes used to establish a communication link between the RF sensor or sensors and the device to discern device location. In certain variations of this embodiment, a plurality of devices can be used to transmit and receive signals from one or multiple RF sensors. One or multiple of the devices have antennas capable of generating multiple radiation modes. Further, a plurality of RF sensors and a plurality of devices can be implemented. One or multiple RF sensors and one or multiple devices contain antennas capable of generating multiple radiation modes. The multiple RF sensors transmit signals to the devices with the devices receiving the signals from the radiation modes of the RF sensors using the multiple radiation modes of the antennas coupled to the devices. The devices transmit signals back to the RF sensors providing amplitude and/or phase information for the radiation modes used to form communication links between the RF sensors and the devices. The processor and algorithm in the system controller are used to analyze the amplitude and/or phase information for the multiple modes used to establish a communication link between the RF sensors and the devices to discern device location.

In certain embodiments, the RF sensors do not transmit, but only receive signals from the devices.

Still further, in certain embodiments a training mode is established to calibrate the location finding system. The RF sensor transmits a signal using the multiple radiation modes of the RF sensor antenna to the device when the device is positioned at a known location. The device is moved to a plurality of known locations within the region serviced by the RF sensor and amplitude and/or phase information is recorded and provided to the system controller. The system controller uses the amplitude and/or phase information at the known locations to calibrate the location finding system.

In other embodiments, a training mode is established to calibrate the location finding system. The RF sensors transmit signals to the device when the device is positioned at a known location. The device receives the RF signals using multiple radiation modes of the antenna coupled to the device. The device is moved to a plurality of known locations within the region serviced by the RF sensors and amplitude and/or phase information is recorded and provided to the system controller. The system controller uses the amplitude and/or phase information at the known locations to calibrate the location finding system.

While particular embodiments of the present invention have been disclosed, it is to be understood that various modifications and combinations of the above features are possible and are contemplated within the true spirit and scope of the appended claims. There is no intention, therefore, of limitations to the exact abstract and disclosure herein presented.

The invention claimed is:

1. A system for locating a wireless communication asset within a network region, the system comprising:
 a communication asset including a multi-mode antenna configurable in a plurality of modes, wherein the multi-mode antenna of the communication asset exhibits distinct radiation pattern characteristics when configured in each of the plurality of modes;
 a first sensor, the first sensor including a multi-mode antenna configurable in a plurality of modes, wherein the multi-mode antenna of the first sensor exhibits distinct radiation pattern characteristics when configured in each of the plurality of modes;
 a processor connected to the first sensor, the processor adapted to acquire and store information received at the first sensor;
 wherein the system is adapted to:
  configure the multi-mode antenna of the first sensor in a first mode of the plurality of modes of the multi-mode antenna of the first sensor and configure the multi-mode antenna of the communication asset in a first mode of the plurality of modes of the multi-mode antenna of the communication asset;
  with the multi-mode antenna of the first sensor in the first mode and with the multi-mode antenna of the communication asset in the first mode, sample the network region to obtain a first receive-signal from at least one of the first sensor or the communication asset within the network region, the first receive-signal comprising first information, wherein the first information includes amplitude data and phase data;
  store the first information;
  configure the multi-mode antenna of the first sensor in a second mode of the plurality of modes of the multi-mode antenna of the first sensor and configure the multi-mode antenna of the communication asset in a second mode of the plurality of modes of the multi-mode antenna of the communication asset;
  with the multi-mode antenna of the first sensor in the second mode and with the multi-mode antenna of the communication asset in the second mode, sample the network region to obtain a second receive-signal from at least one of the first sensor or the communication asset within the network region, the second receive-signal comprising second information, wherein the second information includes amplitude data and phase data;
  store the second information;
  determine a signal variation based at least in part on a difference between the first information and the second information;
  determine data associated with one or more potential locations of the communication asset within the network region based at least in part on a comparison of the signal variation to a priori knowledge of radiation pattern characteristics, the data associated with each of the potential locations comprising a direction and a distance to the communication asset; and
  eliminate, based at least in part on the comparison and based at least in part on the a priori knowledge of radiation pattern characteristics, one or more incorrect potential locations of the communication asset from the one or more potential locations of the communication asset.

2. The system of claim 1, further comprising a second sensor having a multi-mode antenna, wherein the system is adapted to:
 configure the multi-mode antenna of the second sensor in one of a plurality of modes of the second sensor;
 sample the network region to obtain a third received signal from the communication asset;
 reconfigure the multi-mode antenna of the second sensor in another of the plurality of modes of the second sensor; and
 sample the network region to obtain a fourth receive: signal from the communication asset.

3. The system of claim 2, wherein the system is configured to determine the data associated with one or more potential locations of the communication asset based at least in part on the third receive-signal and the fourth receive-signal.

4. The system of claim 1, further comprising a second sensor having an antenna with one fixed radiation pattern mode, wherein the system is adapted to:
 configure the multi-mode antenna of the communication asset in one of the plurality of modes of the communication asset;
 sample the network region with the first sensor and the second sensor to obtain a third receive-signal from the communication asset;
 reconfigure the multi-mode antenna of the communication asset in another of the plurality of modes of the communication asset, and
 sample the network region with the first sensor and the second sensor to obtain a fourth receive-signal from the communication asset.

5. The system of claim 4, wherein the system is configured to determine the data associated with one or more potential locations of the communication asset based at least in part on the third receive-signal and the fourth receive-signal.

6. The system of claim 1 comprising three or more sensors.

7. The system of claim 1, wherein the multi-mode antenna of the first sensor comprises a radiating element, and a parasitic conductor element positioned adjacent to the radiating element, the parasitic conductor element coupled to an active component or circuit for varying a reactance associated with the parasitic conductor element, wherein the multi-mode antenna of the first sensor is reconfigurable between the plurality of possible modes upon varying the reactance associated with the parasitic conductor element.

8. The system of claim 1, wherein at least one of the first receive-signal or second receive-signal is transmitted from the communication asset to the first sensor.

9. The system of claim 1, wherein at least one of the first receive-signal or second receive-signal is transmitted from the first sensor to the communication asset.

10. The system of claim 1, wherein the system is further adapted to:
 configure the multi-mode antenna of the first sensor in the first mode of the plurality of modes of the multi-mode antenna of the first sensor and configure the multi-mode antenna of the communication asset in the second mode of the plurality of modes of the multi-mode antenna of the communication asset;

with the multi-mode antenna of the first sensor in the first mode and with the multi-mode antenna of the communication asset in the second mode, sample the network region to obtain a third receive-signal from at least one of the first sensor or the communication asset within the network region, the third receive-signal comprising third information, wherein the third information includes amplitude data, phase data, or a combination thereof; and analyze the third information and at least one of the first information or second information based at least in part on a comparison of the respective amplitude or phase data of the third information and the at least one of the first information or second information to determine the data associated with one or more potential locations of the communication asset within the network region.

11. The system of claim 1, wherein the a priori knowledge of radiation pattern characteristics comprises an amplitude or phase response of the plurality of modes of the multi-mode antenna of the first sensor or the plurality of modes of the multi-mode antenna of the communication asset as a function of location.

12. A method for locating a position of a communication asset within a network region, the communication asset including a multi-mode antenna configurable in a plurality of modes, the method comprising:

providing a first sensor connected to a multi-mode antenna, the multi-mode antenna configurable in a plurality of modes, wherein the multi-mode antenna of the first sensor exhibits distinct radiation pattern characteristics when configured in each of the plurality of modes;

providing a processor connected to the sensor, the processor adapted to acquire and store information received at the sensor;

configuring the multi-mode antenna of the first sensor in a first mode of the plurality of modes of the multi-mode antenna of the first sensor and configuring the multi-mode antenna of the communication asset in a first mode of the plurality of modes of the multi-mode antenna of the communication asset;

with the multi-mode antenna of the first sensor in the first mode and with the multi-mode antenna of the communication asset in the first mode, sampling the network region to obtain a first receive-signal from at least one of the first sensor or the communication asset within the network region, the first receive-signal comprising first information, wherein the first information includes amplitude data and phase data;

storing the first information;

configuring the multi-mode antenna of the first sensor in a second mode of the plurality of modes of the multi-mode antenna of the first sensor and configuring the multi-mode antenna of the communication asset in a second mode of the plurality of possible modes of the multi-mode antenna of the communication asset;

with the multi-mode antenna of the first sensor in the second mode and with the multi-mode antenna of the communication asset in the second mode, sampling the network region to obtain a second receive-signal from at least one of the first sensor or the communication asset within the network region, the second receive-signal comprising second information, wherein the second information includes amplitude data and phase data;

storing the second information;

determining a signal variation based at least in part on a difference between the first information and the second information determining data associated with one or more potential locations of the communication asset within the network region based at least in part on a comparison of the signal variation to a priori knowledge of radiation pattern characteristics, the data associated with each of the potential locations comprising a direction and a distance to the communication asset; and eliminating, based at least in part on the comparison and based at least in part on the a priori knowledge of radiation pattern characteristics, one or more incorrect potential locations of the communication asset from the one or more potential locations of the communication asset.

13. The method of claim 12, further comprising: providing a second sensor.

14. The method of claim 13, wherein the second sensor comprises a second multi-mode antenna, the method further comprising:

configuring the second multi-mode antenna in a first mode of the second multi-mode antenna;

sampling with the second sensor to obtain a third receive-signal from the communication asset with the second multi-mode antenna configured in the first mode;

reconfiguring the second multi-mode antenna in a second mode of the second multi-mode antenna; and sampling with the second sensor to obtain a fourth receive-signal from the communication asset with the second multi-mode antenna configured in the second mode.

15. The method of claim 14, further comprising: determining the data associated with one or more potential locations of the communication asset based at least in part on the third receive-signal and the fourth receive-signal.

16. The method of claim 12, wherein at least one of the first receive-signal or second receive-signal is transmitted from the communication asset to the first sensor.

17. The method of claim 12, wherein at least one of the first receive-signal or second receive-signal is transmitted from the first sensor to the communication asset.

18. The method of claim 12, further comprising:

configuring the multi-mode antenna of the first sensor in the first mode of the plurality of modes of the multi-mode antenna of the first sensor and configuring the multi-mode antenna of the communication asset in the second mode of the plurality of modes of the multi-mode antenna of the communication asset;

with the multi-mode antenna of the first sensor in the first mode and with the multi-mode antenna of the communication asset in the second mode, sampling the network region to obtain a third receive-signal from at least one of the first sensor or the communication asset within the network region, the third receive-signal comprising third information, wherein the third information includes amplitude data, phase data, or a combination thereof; and analyzing the third information and at least one of the first information or second information based at least in part on a comparison of the respective amplitude or phase data of the third information and the at least one of the first information or second information to determine the data associated with one or more potential locations of the communication asset within the network region.

19. The method of claim 12, wherein the a priori knowledge of radiation pattern characteristics comprises an amplitude or phase response of the plurality of modes of the multi-mode antenna of the first sensor or the plurality of modes of the multi-mode antenna of the communication asset as a function of location.

* * * * *